United States Patent
Sakai

(10) Patent No.: US 11,310,703 B2
(45) Date of Patent: Apr. 19, 2022

(54) COMMUNICATION APPARATUS, CONTROL METHOD, AND STORAGE MEDIUM

(71) Applicant: CANON KABUSHIKI KAISHA, Tokyo (JP)

(72) Inventor: Tatsuhiko Sakai, Tokyo (JP)

(73) Assignee: CANON KABUSHIKI KAI SHA, Tokyo (JP)

( * ) Notice: Subject to any disclaimer, the term of this patent is extended or adjusted under 35 U.S.C. 154(b) by 0 days.

(21) Appl. No.: 16/823,451

(22) Filed: Mar. 19, 2020

(65) Prior Publication Data

US 2020/0314707 A1    Oct. 1, 2020

(30) Foreign Application Priority Data

Mar. 26, 2019   (JP) .............................. JP2019-058904

(51) Int. Cl.
*H04W 4/00*        (2018.01)
*H04W 36/00*      (2009.01)
(Continued)

(52) U.S. Cl.
CPC ....... *H04W 36/0069* (2018.08); *H04W 76/15* (2018.02); *H04W 76/27* (2018.02); *H04W 88/06* (2013.01); *H04W 92/20* (2013.01)

(58) Field of Classification Search
CPC . H04W 36/0069; H04W 76/00; H04W 76/10; H04W 76/11; H04W 76/12;
(Continued)

(56) References Cited

U.S. PATENT DOCUMENTS

2013/0117696 A1   5/2013  Robertson
2014/0126403 A1   5/2014  Siomina
(Continued)

FOREIGN PATENT DOCUMENTS

JP       2018056865 A     4/2018

OTHER PUBLICATIONS

3rd Generation Partnership Project; Technical Specification Group Radio Access Network; Evolved Universal Terrestrial Radio Access (E-UTRA) and NR; Multi-connectivity; Stage 2 (Release 15) (3GPP TS 37.340 V15.4.0). Dec. 2018: 1-67. Cited in Specification.
(Continued)

*Primary Examiner* — Huy C Ho
(74) *Attorney, Agent, or Firm* — Rossi, Kimms & McDowell LLP

(57) ABSTRACT

A communication apparatus capable of executing concurrent communication with a first base station and a second base station based on Dual Connectivity (DC) defined in cellular communication standards of the Third Generation Partnership Project is provided. The first base station operates as a master node in the DC and the second base station operates as a secondary node in the DC. If the state of the communication apparatus has transitioned from an RRC_Inactive state to an RRC_Connected state in a state in which settings related to the DC are maintained, the communication apparatus controls the state of the communication apparatus to maintain the RRC_Connected state regardless of whether or not connection processing for establishing a connection to the second base station is successful.

11 Claims, 4 Drawing Sheets

(51) Int. Cl.
*H04W 76/15* (2018.01)
*H04W 76/27* (2018.01)
*H04W 88/06* (2009.01)
*H04W 92/20* (2009.01)

(58) Field of Classification Search
CPC ..... H04W 76/14; H04W 76/15; H04W 76/18; H04W 76/19; H04W 76/20; H04W 76/22; H04W 76/23; H04W 76/25; H04W 76/27; H04W 76/30; H04W 76/34; H04W 76/36; H04W 88/06; H04W 88/08; H04W 88/10; H04W 88/12; H04W 92/20
USPC .......................................................... 370/329
See application file for complete search history.

(56) References Cited

U.S. PATENT DOCUMENTS

| | | |
|---|---|---|
| 2014/0203950 A1 | 7/2014 | Zdeblick |
| 2015/0146599 A1* | 5/2015 | Jha ........................ H04L 1/0026 370/311 |
| 2017/0318504 A1* | 11/2017 | Zhang ............... H04W 36/0055 |
| 2018/0084523 A1 | 3/2018 | Uchiyama |
| 2019/0320361 A1 | 10/2019 | Uchiyama |
| 2019/0349950 A1 | 11/2019 | Takano |
| 2020/0112853 A1* | 4/2020 | Jiang ...................... H04L 5/0053 |
| 2020/0169922 A1* | 5/2020 | Ozturk .................. H04W 76/27 |
| 2020/0228963 A1 | 7/2020 | Furuichi |
| 2020/0245391 A1 | 7/2020 | Yamamoto |
| 2020/0305225 A1 | 9/2020 | Zhang |
| 2020/0374892 A1 | 11/2020 | Kusashima |
| 2020/0396764 A1 | 12/2020 | Lin |
| 2021/0084525 A1 | 3/2021 | Takano |

OTHER PUBLICATIONS

Copending U.S. Appl. No. 16/823,515, filed Mar. 19, 2020.
Notice of Allowance issued in U.S. Appl. No. 16/823,515 dated Apr. 1, 2021.

* cited by examiner

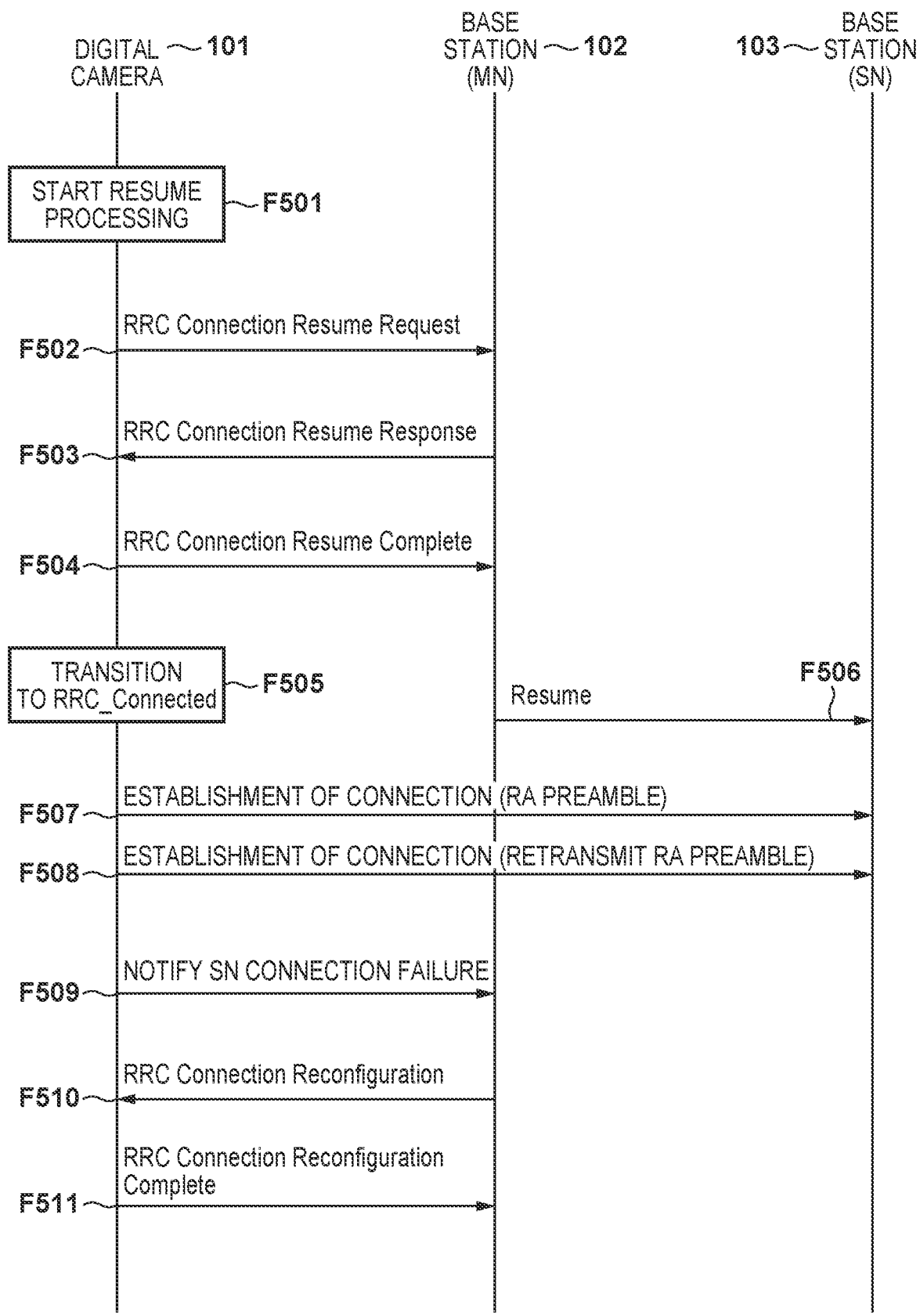

COMMUNICATION APPARATUS, CONTROL METHOD, AND STORAGE MEDIUM

BACKGROUND OF THE INVENTION

Field of the Invention

The present invention relates to a technology for controlling the state of a wireless communication apparatus.

Description of the Related Art

Cellular communication standards of the Fifth Generation (5G) are being established in the 3GPP (Third Generation Partnership Project). So far, a Dual Connectivity (DC) function that enables a terminal equipment (User Equipment, UE) to be connected to a plurality of base stations and concurrently communicate with the plurality of base stations has been standardized in the cellular communication standards. If a UE concurrently communicates with a plurality of base stations based on the DC, user throughput and communication reliability can be improved. The DC enables a UE to concurrently communicate with a base station that functions as a Master Node (MN) that manages Radio Resource Control (RRC) connection and context of the UE and a base station that functions as a Secondary Node (SN) that does not perform such management.

Regarding the state of the UE, an RRC_Inactive state is defined in 5G, in addition to an RRC_Idle state, which is a conventional unconnected state, and an RRC_Connected state, which is a connected state. In the RRC_Inactive state, the UE is in an unconnected state in a lower layer but is in a connected state in an upper layer with a base station. Transmission of control signals to the UE in the RRC_Inactive state is suppressed, and accordingly power consumption of the UE can be suppressed, and the UE can immediately establish a network connection when resuming communication because the UE is in the connected state in the upper layer.

3GPP TS 37.340 V15.4.0 describes processing that is performed when a UE that has been performing communication using the DC transitions to the RRC_Inactive state, and also describes that the UE can resume the RRC_Connected state if radio resources of the MN and the SN before the transition can be used. On the other hand, specific processing for resuming the RRC_Connected state as described above is not defined.

SUMMARY OF THE INVENTION

The present invention provides a technology for efficiently resuming connection of a terminal equipment.

According to one aspect of the present invention, there is provided a communication apparatus capable of executing concurrent communication with a first base station and a second base station based on Dual Connectivity (DC) defined in cellular communication standards of the Third Generation Partnership Project, the first base station operating as a master node in the DC and the second base station operating as a secondary node in the DC, the communication apparatus comprising: one or more processors; and one or more memories that store a computer-readable instruction that causes, when executed by the one or more processors, the communication apparatus to control the state of the communication apparatus such that, if the state of the communication apparatus has transitioned from an RRC_Inactive state to an RRC_Connected state in a state in which settings related to the DC are maintained, the RRC_Connected state is maintained regardless of whether or not connection processing for establishing a connection to the second base station is successful.

Further features of the present invention will become apparent from the following description of exemplary embodiments (with reference to the attached drawings).

BRIEF DESCRIPTION OF THE DRAWINGS

FIG. 5 is a diagram showing an example of a flow of processing executed in the wireless communication network.

DESCRIPTION OF THE EMBODIMENTS

Figure 1:
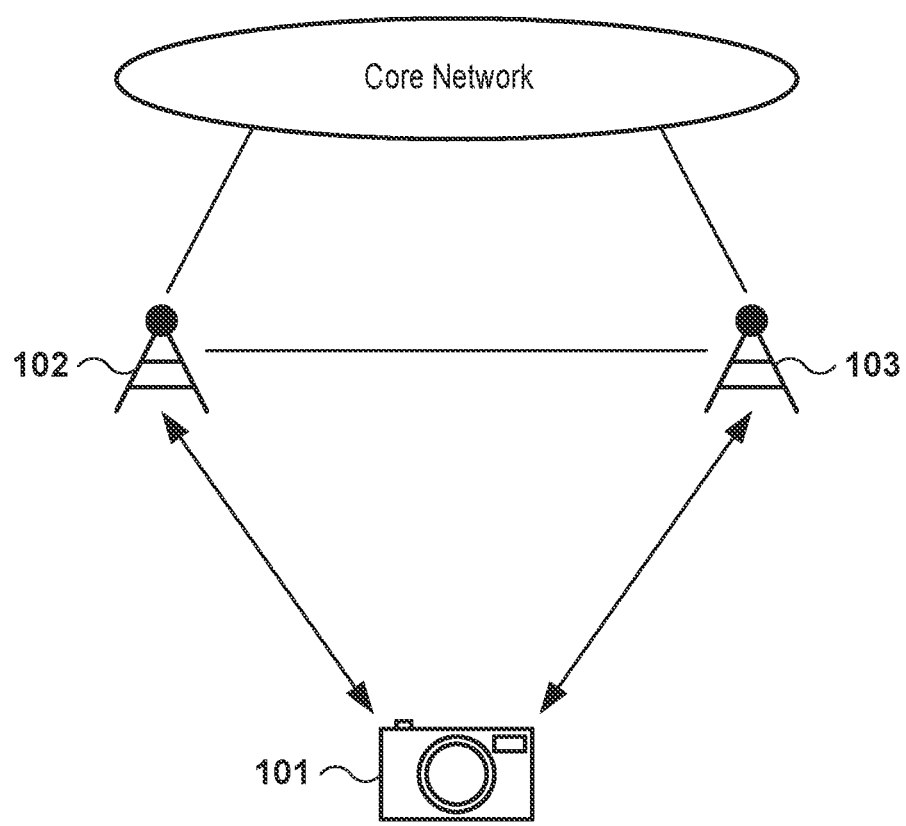
FIG. 1 is a diagram showing an example of a configuration of a wireless communication network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

System Configuration

FIG. 1 shows an example of a configuration of a wireless communication system according to the present embodiment. In one example, the wireless communication system is a cellular communication system and includes a digital camera 101, a base station 102, and a base station 103. Note that the base station 102 is a base station (eNB) conforming to LTE (Long Term Evolution) standards, for example. The base station 103 is a base station (gNB) of the Fifth Generation (5G) cellular communication system (New Radio, NR), for example. The digital camera 101 is one example of a user terminal (UE). The UE need not necessarily have to be a digital camera, and may be any communication apparatus, such as a Personal Computer (PC), a smartphone, a mobile phone, a Personal Digital Assistant (PDA), etc., that can be connected to base stations of the cellular communication system. Note that the configuration shown in FIG. 1 is one example, and the wireless communication system may be constituted by a group of communication apparatuses that can execute processing described below. In the following description, technical terms that are used in cellular communication standards, such as LTE, 5G, etc., are used for the sake of convenience, but these technical terms can be replaced with terms of a communication system to which the processing described below is applied.

In the configuration shown in FIG. 1, the digital camera 101 is configured to support a function for being concurrently connected to two or more base stations (the base stations 102 and 103) and concurrently communicating with the two or more base stations. Such a function for concurrently communicating with a plurality of base stations will be referred to as a Dual Connectivity (DC) function, and concurrent communication performed based on the DC will be referred to as DC communication. The digital camera 101 is capable of concurrently receiving information from a network via two or more base stations and concurrently transmitting data to the network via the two or more base stations, using DC communication. In one example, the digital camera 101 can upload captured image data obtained through capturing to a server via the base stations 102 and 103 using DC communication. Note that the base stations 102 and 103 may each transmit captured image data received from the digital camera 101 to an upper station on a core network or a server that is connected to another network outside the core network, for example. In the following example, assume that the base station 102 functions as a Master Node (MN) and the base station 103 functions as a Secondary Node (SN) in DC communication performed by the digital camera 101. The role of the MN is to control concurrent communication performed between the UE and a plurality of base stations using the DC and communication performed with the core network above the base stations. Note that, in the following description, the "base station that operates as the MN" may also be simply referred to as the "MN", and similarly, the "base station that operates as the SN" may also be simply referred to as the "SN".

In one example of the DC, a notification that indicates, for example, whether a radio resource of the SN is used by the UE is transmitted from the SN to the MN and, based on the notification, the MN causes the UE to transition to the RRC_Inactive state while maintaining the state of the DC. Thereafter, the MN may cause the UE to resume the RRC_Connected state by executing Resume processing in response to the generation of data to be transmitted to the UE, for example. It is envisaged that, at this time, the UE cannot be connected to the MN and the SN to which the UE has been connected just before transitioning to the RRC_Inactive state, due to movement of the UE, for example, and the UE cannot resume the state before the state transition. Here, if the UE cannot resume the state in which communication can be performed using the DC, connection establishment processing based on the DC may be executed again after the UE is once caused to transition to the RRC_Idle state. However, in this case, the UE transitions to the RRC_Idle state even if the UE can resume connection to the MN although the UE cannot resume connection to the SN. As a result, although the UE is in a state in which it can communicate with the MN, the UE executes processing for reestablishing a connection to the MN, and the resume process takes time, and the efficiency may be reduced due to the occurrence of unnecessary signaling, for example.

The present embodiment provides a method for the UE (digital camera 101) to efficiently resume the RRC_Connected state from the RRC_Inactive state in a state (hereinafter, this state may also be referred to as a "DC state") in which settings related to the DC are maintained. Note that settings related to the DC include information regarding RRC connection and context that have been used in DC communication, and a state in which the settings are maintained is a state in which this information is managed by at least any of the UE, the base stations, and the network. If the UE has resumed the RRC_Connected state in the connection to the MN, the UE maintains the RRC_Connected state regardless of a result of processing for resuming the connection to the SN. Accordingly, the UE can resume the RRC_Connected state in the connection to the MN without transitioning to the RRC_Idle state as a result of being unable to resume the connection to the SN, and unnecessary use of time and the occurrence of unnecessary signaling can be prevented. The following describes a configuration of the UE (digital camera 101) that executes such processing and a flow of the processing.

Apparatus Configuration

Figure 2:
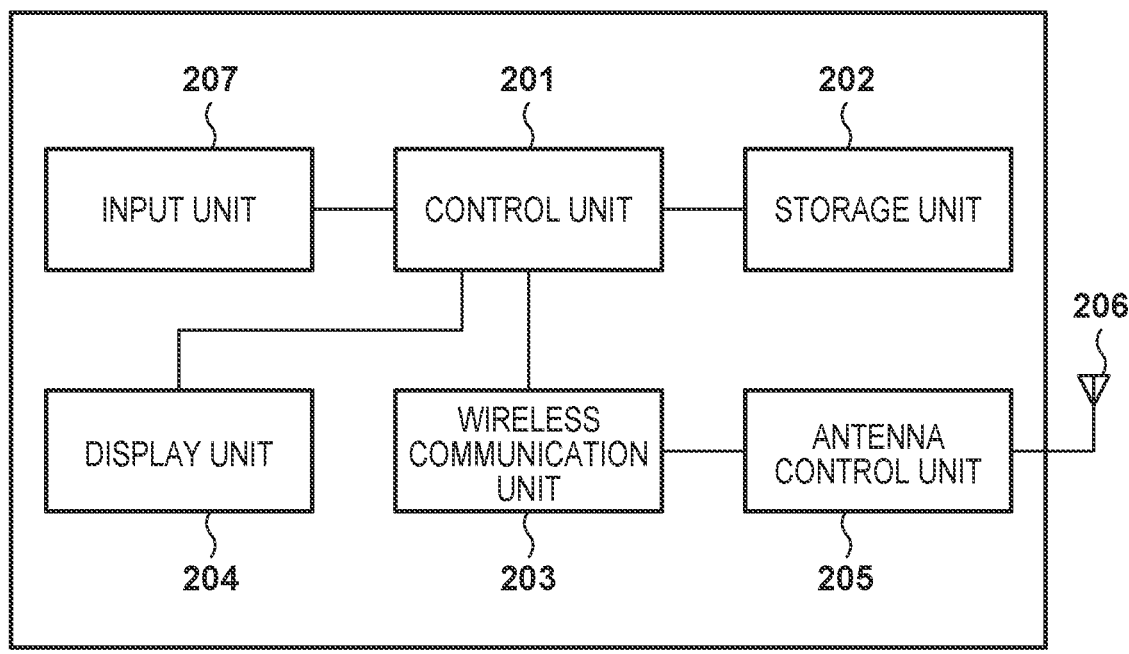
FIG. 2 is a diagram showing an example of a hardware configuration of a communication apparatus.

FIG. 2 shows an example of a hardware configuration of the digital camera 101 according to the present embodiment. The digital camera 101 includes a control unit 201, a storage unit 202, a wireless communication unit 203, a display unit 204, an antenna control unit 205, an antenna 206, and an input unit 207, for example.

The control unit 201 controls the entire digital camera 101 by executing a control program stored in the storage unit 202. The control unit 201 includes one or more processors such as a CPU (Central Processing Unit) and an MPU (Micro Processing Unit), for example. The control unit 201 may also include hardware, such as an ASIC (Application Specific Integrated Circuit) or a DSP (Digital Signal Processor), and a gate array circuit, such as an FPGA (Field Programmable Gate Array), for example. The storage unit 202 stores the control program to be executed by the control unit 201 and various kinds of information such as image data, communication parameters, etc. Various operations described below can be realized as a result of the control unit 201 executing the control program stored in the storage unit 202. The storage unit 202 includes a ROM (Read-Only Memory), a RAM (Random Access Memory), an HDD (Hard Disk Drive), a flash memory, or a storage medium such as a removable SD (Secure Digital) card, for example.

The wireless communication unit 203 executes various kinds of processing for performing communication conforming to cellular communication standards defined by the 3GPP (Third Generation Partnership Project). The wireless communication unit 203 includes a circuit chip in which a wireless communication circuit, such as a Radio Frequency (RF) circuit or a Base Band (BB) circuit, is formed, for example. The display unit 204 presents various kinds of information to the outside using a function that enables output of visually recognizable information, as is the case with an LCD (Liquid Crystal Display) or an LED (Light-Emitting Diode), or output sound, as is the case with a speaker. Namely, the display unit 204 has a function for outputting at least visual information or audio information. Note that, in a case in which the display unit 204 displays visual information, the display unit 204 may include a VRAM (Video RAM) that can hold image data corresponding to visual information to be displayed, and perform display control for causing the LCD or the LED to continuously display image data stored in the VRAM, for example. The antenna control unit 205 controls the antenna 206 that supports a frequency band (for example, 800 MHz band, 1.5 GHz band, 2 GHz band, etc.) that is used in the cellular communication system. The input unit 207 is an apparatus that accepts various kinds of input from a user, and is used by the user to operate the digital camera 101.

Note that the configuration shown in FIG. 2 is merely one example, and the digital camera 101 may also have a different hardware configuration and a configuration is also possible in which the digital camera 101 does not include some hardware. The digital camera 101 may also include a lens, a switch, etc. for functioning as the digital camera, for example. Also, two or more of the above-described blocks may be integrated into one block. For example, the digital camera 101 may also include a touch panel into which at least some portions of the display unit 204 and the input unit 207 are integrated. Alternatively, one block may also be divided into two or more blocks.

Figure 3:
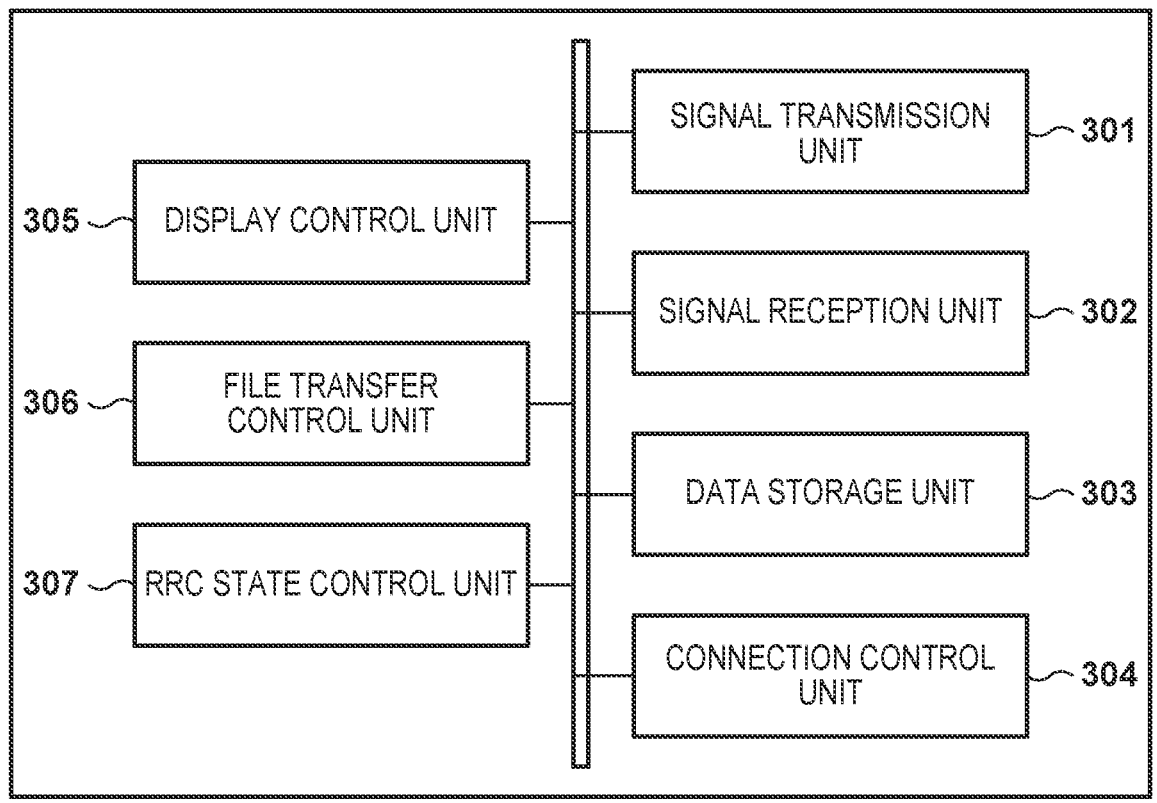
FIG. 3 is a diagram showing an example of a software functional configuration of the communication apparatus.

FIG. 3 shows an example of a functional configuration of the digital camera 101. The example of the functional configuration of the digital camera 101 includes a signal transmission unit 301, a signal reception unit 302, a data storage unit 303, a connection control unit 304, a display control unit 305, a file transfer control unit 306, and an RRC state control unit 307. In one example, these functional units are realized as a result of a program stored in the storage unit 202 of the digital camera 101 being executed by the control unit 201.

The signal transmission unit 301 and the signal reception unit 302 execute communication with communication partner apparatuses (the base stations 102 and 103) following cellular communication standards (LTE standards or 5G standards) to which the respective partner apparatuses conform. The data storage unit 303 stores and holds software for executing predetermined processing and information such as authentication information. The connection control unit 304 executes processing related to establishment and cutting of connections to the base stations. The connection control unit 304 also executes setting processing between the digital camera 101 and the base stations related to the DC. The display control unit 305 executes processing for controlling a screen displayed by the display unit 204 or audio output by the display unit 204, for example. The file transfer control unit 306 controls processing for transferring a file of captured image data etc. stored in the storage unit 202 to another apparatus using wireless communication, for example. The RRC state control unit 307 controls and manages RRC states, such as RRC_Idle, RRC_Connected, and RRC_Inactive, of the digital camera 101. In one example, RRC state transition processing described later is executed by the RRC state control unit 307.

Flow of Processing

Figure 4:
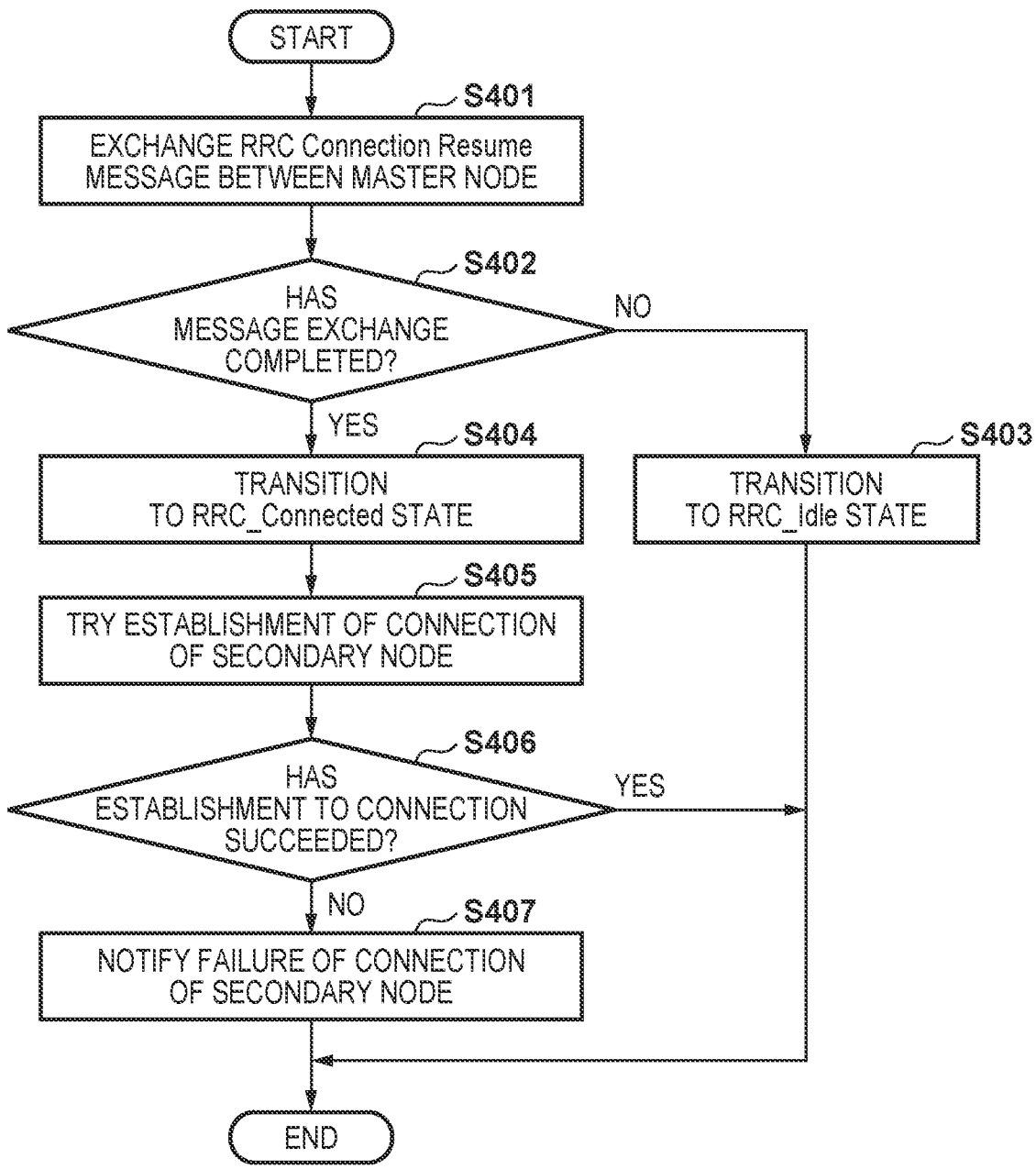
FIG. 4 is a diagram showing an example of a flow of processing executed by the communication apparatus.

Next, flows of processing to be executed will be described using FIGS. 4 and 5. FIG. 4 shows an example of a flow of processing executed by the digital camera 101. The processing shown in FIG. 4 is realized as a result of a program stored in the storage unit 202 of the digital camera 101 being executed by the control unit 201, for example. Also, FIG. 5 shows an example of a flow of processing executed in the wireless communication system. In this example, assume that the base station 102 operates as the MN and the base station 103 operates as the SN as described above in DC communication performed with the digital camera 101. In the following processing, assume that the digital camera 101 has initially executed DC communication with the base stations 102 and 103, and thereafter has transitioned to the RRC_Inactive state with settings related to the DC being maintained.

In this state, the digital camera 101 determines to start processing for resuming the RRC_Connected state (F501). The digital camera 101 determines to start this processing based on the generation of captured image data to be transmitted to a server etc. on the network or the generation, on the network side, of data to be transmitted to the digital camera 101 using a paging channel, for example.

Then, the digital camera 101 transmits an RRC Connection Resume Request message to the MN (base station 102) using the connection control unit 304 (F502). In one example, the digital camera 101 may transmit this message using a random access procedure. Namely, the digital camera 101 transmits a Random Access preamble (RA preamble) to the MN, and receives a Random Access response (RA response) from the MN. Then, the digital camera 101 transmits the RRC Connection Resume Request message using a radio resource that is specified by a UL (Up Link) grant included in the RA response. Upon receiving the RRC Connection Resume Request message, the MN transmits an RRC Connection Resume Response message in response (F503). Note that this procedure is one example, and the digital camera 101 may also transmit and receive the messages by following a procedure other than the random access procedure, so long as the RRC Connection Resume messages can be exchanged with the MN.

The digital camera 101 determines whether or not exchange of the RRC Connection Resume messages is completed (step S402). For example, the digital camera 101 determines whether or not the RRC Connection Resume Response message is received. The digital camera 101 may determine that exchange of the messages is not completed if a predetermined period has elapsed without exchange of the messages being completed, for example. Upon determining that exchange of the messages with the MN is not completed (NO in step S402), the digital camera 101 transitions to the RRC_Idle state (step S403) regardless of the state of the SN, and ends the processing. Note that the digital camera 101 may also transition to the RRC_Idle state and end the processing if the digital camera 101 has failed in the random access procedure performed between the digital camera 101 and the MN. Note that the digital camera 101 thereafter executes processing for establishing a connection to a base station in the vicinity of the digital camera 101, for example. This connection processing is similar to conventional connection processing performed from the RRC_Idle state, and therefore a description of this connection is omitted. In FIG. 5, it is assumed that the digital camera 101 completes exchange of the messages with the MN. In this case, upon determining that exchange of the messages with the MN is completed (YES in step S402), the digital camera 101 transmits an RRC Connection Resume Complete message to the MN using the connection control unit 304 (F504). Then, the digital camera 101 transitions to the RRC_Connected state using the RRC state control unit 307 (step S404, F505). Upon receiving the RRC Connection Resume Complete message, the MN transmits a Resume message to notify the SN that the digital camera 101 has resumed (F506).

Thereafter, the digital camera 101 tries to establish a connection to the SN using the connection control unit 304 (step S405). Note that, in the present embodiment, the digital camera 101 tries to establish the connection using a random access procedure as described above, for example. Namely, the digital camera 101 may execute a procedure for transmitting an RA preamble (F507) and receiving an RA response from the SN. Here, if the digital camera 101 does not receive an RA response from the SN, the digital camera 101 retransmits the RA preamble for a predetermined period or a predetermined number of times (F508). Then, if the digital camera 101 receives an RA response to any of the transmitted RA preambles or after transmission and reception of RRC messages are thereafter completed, the digital camera 101 may determine that the establishment of the connection is successful. Upon having succeeded in the establishment of the connection to the SN (YES in step S406), the digital camera 101 ends the resume processing shown in FIG. 4. In this case, the digital camera 101 has succeeded in resuming the state in which the digital camera 101 can perform communication based on the DC, and accordingly is enabled to concurrently communicate with the MN and the SN.

On the other hand, if the digital camera 101 does not receive an RA response even though the digital camera 101 has retransmitted the RA preamble for the predetermined period or the predetermined number of times, or transmission and reception of the RRC messages are not completed, the digital camera 101 may determine that the establishment of the connection is not successful. Note that the above-described processing is one example, and a configuration is also possible in which the establishment of the connection is tried using other processing and whether or not the establishment of the connection is successful is determined using a method suitable for the procedure used for the establishment of the connection. Here, assume that a connection between the digital camera 101 and the SN cannot be established because the digital camera 101 is located outside the range of a cell formed by the SN, for example.

If the digital camera 101 has failed to establish a connection to the SN (NO in step S406), the digital camera 101 notifies the MN of the failure of the connection to the SN using the connection control unit 304 (step S407), and ends the processing. The digital camera 101 may notify the MN of the failure of the connection to the SN by transmitting a Link Failure Information message, for example. However, there is no limitation thereto, and the notification of the failure of the connection to the SN may be made in any form. Thus, the MN that controls DC communication can be caused to recognize that the current state is a state in which DC communication can no longer be executed. In response to this notification, the MN can execute appropriate processing such as processing described below, for example.

After notifying the MN of the failure of the connection to the SN, the digital camera 101 may receive, from the MN, an RRC Connection Reconfiguration message that instructs the digital camera 101 to change the configuration of DC communication (F510). In this case, the digital camera 101 controls settings of the DC following the content of the message. For example, the connection control unit 304 may try to establish a connection to another SN or end the DC, according to the content of the message. Then, after controlling settings of DC communication, the digital camera 101 transmits an RRC Connection Reconfiguration Complete message to the MN (F511). Thus, the configuration of the DC is changed, and accordingly the digital camera 101 is enabled to execute DC communication with the MN and another SN or communicate with the MN without using the DC.

As shown in FIG. 4, even if the digital camera 101 fails to establish a connection to the SN, the digital camera 101 does not transition to the RRC_Idle state. Namely, the digital camera 101 operating in the RRC_Inactive state while the DC state is maintained transitions to the RRC_Connected state in response to the success of the connection to the MN in the resume processing. Then, the digital camera 101 operates to maintain the RRC_Connected state even if the digital camera 101 fails to establish a connection to the SN. Thus, a situation can be prevented in which the connected state with the MN is cancelled and processing for establishing a connection to the MN is executed again due to the failure of the connection to the SN. As a result, the generation of a period for which communication cannot be performed and the occurrence of unnecessary signaling can be suppressed, and the efficiency of the resume processing can be improved. Furthermore, the digital camera 101 can immediately resume data communication at this time, and accordingly power consumption can be suppressed and convenience for the user can be improved, for example.

Note that the display control unit 305 may control the display unit 204 to display a notification that indicates a failure in the processing for establishing a connection to the SN, termination of DC communication based on the failure, or a state in which communication cannot be performed with the SN, for example. It is also possible to notify the user that communication cannot be performed with the SN, by using another method such as a method of making the notification using an application incorporated in the digital camera 101, for example. As a result, the user can recognize that DC communication will not be performed, and take measures such as moving the digital camera 101 to a place at which a connection to the SN can be established, for example.

Note that the above embodiment is described about resume processing performed from the RRC_Inactive state defined in 5G, and accordingly a case in which the MN is the base station of LTE and the SN is the base station of 5G is described as a general configuration. However, this is one example, and the MN may also be a base station of 5G, for example. Also, the above-described method can be applied to any communication system for which a similar state is defined, such as a communication system in which the MN and the SN are base stations of a future generation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-058904, filed Mar. 26, 2019 which is hereby incorporated by reference herein in its entirety.

What is claimed is:

1. A communication apparatus that executes concurrent communication with a first base station and a second base station based on Dual Connectivity (DC) defined in cellular communication standards, the first base station operating as a master node in the DC and the second base station operating as a secondary node in the DC, the communication apparatus comprising:
one or more processors; and
one or more memories that store computer-readable instructions that cause, when executed by the one or more processors, the communication apparatus to control a state of the communication apparatus such that, in a case where the state of the communication apparatus has transitioned from an RRC_Inactive state to an RRC_Connected state while settings related to the DC are maintained and connection processing to both the first base station and the second base station is performed, the RRC_Connected state is maintained in a case where connection processing for establishing a connection to the first base station is successful but connection processing for establishing a connection to the second base station is unsuccessful.

2. The communication apparatus according to claim 1, wherein, in the case where the communication apparatus has succeeded in connection processing for establishing a connection to the first base station in a state in which settings of the DC are maintained, the state of the communication apparatus is controlled to transition from the RRC_Inactive state to the RRC_Connected state.

3. The communication apparatus according to claim 1, wherein, in a case where the communication apparatus has failed in connection processing for establishing a connection to the first base station in a state in which settings of the DC are maintained, the state of the communication apparatus is controlled to transition from the RRC_Inactive state to an RRC_Idle state.

4. The communication apparatus according to claim 1, wherein, in the case where the state of the communication apparatus has transitioned to the RRC_Connected state and the communication apparatus has failed in the connection processing for establishing a connection to the second base station, the communication apparatus notifies the first base station of a failure of the connection processing.

5. The communication apparatus according to claim 4, wherein the communication apparatus
receives a message that instructs the communication apparatus to change a configuration of the DC from the first base station, based on the notification, and
changes settings of the DC based on the message.

6. The communication apparatus according to claim 1, wherein the connection processing is performed using a random access procedure.

7. The communication apparatus according to claim 1, wherein the computer-readable instruction causes, when executed by the one or more processors, the communication apparatus to notify a user that communication cannot be performed with the second base station.

8. The communication apparatus according to claim 1, wherein the first base station is a base station of Long Term Evolution (LTE) and the second base station is a base station of the Fifth Generation (5G).

9. The communication apparatus according to claim 1, wherein the communication apparatus is a digital camera.

10. A control method to be executed by a communication apparatus that executes concurrent communication with a first base station and a second base station based on Dual Connectivity (DC) defined in cellular communication standards, the first base station operating as a master node in the DC and the second base station operating as a secondary node in the DC, the control method comprising:
in a case where the state of the communication apparatus has transitioned from an RRC_Inactive state to an RRC_Connected state while settings related to the DC are maintained and connection processing to both the first base station and the second base station is performed, controlling the state of the communication apparatus to maintain the RRC_Connected state in a case where connection processing for establishing a connection to the first base station is successful but connection processing for establishing a connection to the second base station is unsuccessful.

11. A non-transitory computer-readable storage medium storing therein a program for causing a computer that is included in a communication apparatus to control the state of the communication apparatus that is that executes concurrent communication with a first base station and a second base station based on Dual Connectivity (DC) defined in cellular communication standards of the Third Generation Partnership Project, the first base station operating as a master node in the DC and the second base station operating as a secondary node in the DC,
wherein the state of the communication apparatus is controlled such that, in a case where the state of the communication apparatus has transitioned from an RRC_Inactive state to an RRC_Connected state while settings related to the DC are maintained and connection processing to both the first base station and the second base station is performed, the RRC_Connected state is maintained in a case where connection processing for establishing a connection to the first base station is successful but connection processing for establishing a connection to the second base station is unsuccessful.

* * * * *

UNITED STATES PATENT AND TRADEMARK OFFICE
CERTIFICATE OF CORRECTION

PATENT NO. : 11,310,703 B2  
APPLICATION NO. : 16/823451  
DATED : April 19, 2022  
INVENTOR(S) : Tatsuhiko Sakai Page 1 of 1

It is certified that error appears in the above-identified patent and that said Letters Patent is hereby corrected as shown below:

On the Title Page

In Item (73) Assignee: the name of the Assignee should appear as follows:
--CANON KABUSHIKI KAISHA--

Signed and Sealed this  
Twenty-seventh Day of September, 2022

Katherine Kelly Vidal  
*Director of the United States Patent and Trademark Office*